United States Patent [19]

Stewart

[11] 4,282,411
[45] Aug. 4, 1981

[54] RESIDUAL ECHO SUPPRESSOR FOR ECHO CANCELLER

[75] Inventor: Robert C. Stewart, Hinsdale, Ill.
[73] Assignee: Tellabs, Inc., Lisle, Ill.
[21] Appl. No.: 45,176
[22] Filed: Jun. 4, 1979
[51] Int. Cl.³ .............................................. H04B 3/20
[52] U.S. Cl. ................................................ 179/170.2
[58] Field of Search ............... 179/170.2, 170.7, 170.8

[56] References Cited

U.S. PATENT DOCUMENTS

| | | | |
|---|---|---|---|
| 3,508,017 | 4/1970 | Unrue, Jr. ........................ | 179/170.2 |
| 3,754,105 | 8/1973 | Poschenrieder et al. ......... | 179/170.2 |
| 3,894,200 | 7/1975 | Campanella et al. ............. | 179/170.2 |
| 4,005,277 | 1/1977 | Araseki et al. ................... | 179/170.2 |

Primary Examiner—Bernard Konick
Assistant Examiner—Randall P. Myers
Attorney, Agent, or Firm—Gary, Juettner & Pyle

[57] ABSTRACT

A residual echo suppressor for an echo canceller compares the levels of the uncancelled signal and the residual signal. If the level of the residual signal has a selected proportionality to the level of the uncancelled signal, it is assumed that the residual signal consists solely of echo and it is suppressed to zero. If the residual signal fails the proportionality test, which indicates that it may contain speech, it is transmitted in its entirety. To prevent sporadic transmissions of residual signal which fails the proportionality test, but which might not contain speech, a hysteresis circuit blocks transmission of the residual signal upon the same continuously failing the proportionality test for a selected time, at the end of which time the residual signal is assumed to contain speech and is transmitted.

33 Claims, 8 Drawing Figures

RESIDUAL ECHO SUPPRESSOR FOR ECHO CANCELLER

BACKGROUND OF THE INVENTION

The present invention relates to a residual echo suppressor for an echo canceller, which effectively prevents echo disturbances in long delay telephone circuits.

Long distance telephone facilities usually comprise four-wire transmission circuits between central switching offices at different local exchange areas, and two-wire circuits within each exchange area connecting individual subscribers with the switching office. A call between subscribers in different exchange areas is carried over a two-wire circuit in each of the areas and a four-wire circuit between the areas, with conversion of speech energy between the two and the four-wire circuits being effected by hybrid circuits. Ideally, the hybrid circuit input ports perfectly match the impedances of the two and four-wire circuits, and its balance network impedance perfectly matches the impedance of the two-wire circuit, so that signals transmitted from one exchange area to the other will not be reflected or returned to the one area as echo. Unfortunately, due to impedance differences which inherently exist between different two and four-wire circuits, and because impedances must be matched at each frequency in the voice band, it is virtually impossible for a given hybrid circuit to perfectly match the impedances of any particular two and four-wire transmission circuit. Echo is, therefore, characteristically part of a long distance telephone system.

Although undesirable, echo is tolerable in a telephone system so long as the time delay in the echo path is relatively short, for example shorter than 40 milliseconds. However, longer echo delays can prove to be utterly confusing to a far end speaker, and to reduce the same to a tolerable level an echo canceller may be provided toward each end of the path to cancel the echo that would otherwise return to the far end speaker. As is known, echo cancellers monitor the signal on the receive channel of a four-wire transmission circuit and generate an echo estimate of the actual echo that is expected to return over the transmit channel. The echo estimate is then subtracted from the echo that occurs on the transmit channel to remove or at least reduce the echo.

Ideally, the echo estimate generated by the echo canceller is identical to the echo occurring on the transmit channel, so that upon its substraction from the echo signal a complete cancellation of echo results. In practice, however, although the echo estimate may be a good approximation of the actual echo, it is usually not possible through cancellation to reduce the echo signal by more than 30 dB, so that residual echo remains. Consequently, additional control is required to eliminate the residual echo in order to achieve an acceptable level of performance in the telephone system.

One known technique contemplated by the prior art for dealing with residual echo has been termed "adaptive center clipping". This is a suppression technique based on a comparison of the time-averaged speech energy components on the transmit and receive paths, wherein suppression is enacted in the event of receive speech energy being greater than transmit speech energy. In an analog approach, a variable threshold amplifier receives the residual signal from the echo canceller and creates a squelching action to remove or clip center portions of the signal which have a level less than a reverse bias voltage. The reverse bias voltage is usually made to vary as a function of the time averaged level of received speech, and as long as the residual echo signal is lower in level than the reverse bias voltage it is completely blocked from being transmitted.

Although adaptive center clipping is effective to remove residual echo levels below the threshold established by the reverse bias voltage, sporadic residual echo levels in excess of the threshold are nevertheless transmitted to the far end subscriber. In addition, crossover distortion results from removing the center portions of speech signals the upper levels of which are greater than the threshold voltage. The effects of crossover distortion may be decreased through preemphasis and deemphasis filtering and by removing adaptive center clipping whenever near end speech is detected through time averaged speech comparisons, but this requires a "break-in" time of 50 to 150 milliseconds and a "hang-over" time of 100 to 240 milliseconds which delay insertion and removal of adaptive center clipping.

In accordance with a known digitally implemented center clipping technique, residual echo is reduced by blocking from transmission a fixed number of the lesser significant bits of the digitally encoded signal when near end speech is absent, and by passing all of the bits when near end speech is present as determined by a double talk detector. Unfortunately, if double talk detection is done on an instantaneous speech sample comparison basis, false detection of double talk and passage of residual echo is encountered when a zero cross-over value on the receive channel signal is compared in magnitude with an echo signal which at that time has a nonzero value. This induces "choppiness" in the residual echo, allowing portions of it to pass through unsuppressed. Should the speech samples be time averaged prior to comparison in order to minimize false detection of double talk, it is then necessary to delay insertion and removal of residual echo suppression. Also, as in the analog approach a form of cross-over distortion results since only those portions of the digitally encoded signal which are greater than the "fixed threshold" are transmitted. Consequently, the conventional digital approach to residual echo suppression has the same disadvantages as the analog technique.

OBJECTS OF THE INVENTION

An object of the present invention is to provide a residual echo suppressor for an echo canceller in which there is no cross-over distortion effect in signals passed therethrough.

Another object of the invention is to provide such a residual echo suppressor which is substantially instantaneous in its operation.

A further object of the invention is to provide such a residual echo suppressor wherein suppression occurs only upon the residual echo level having a selected proportionality to the level of instantaneous uncancelled echo for a selected time, and wherein suppression is removed only when the selected proportionality ceases to exist for the selected time.

SUMMARY OF THE INVENTION

In accordance with the present invention, a residual echo suppressor for use with an echo canceller in telephone systems having separate transmit and receive channels, wherein the echo canceller is of the type having a subtractor in the transmit channel for subtracting or cancelling an echo estimate from a true echo in an uncancelled signal on the channel to leave a residual signal on the channel, comprises means in the transmit channel for comparing the values of the uncancelled and the residual signals and for suppressing the residual signal when the value of the same has a selected proportionality to the value of the uncancelled signal.

In the preferred embodiment means are provided for detecting the presence of speech signals on the transmit channel and for controlling said comparing and suppressing means to prevent suppression of the residual signal when speech signals are present. In addition, to prevent the sporadic transmission of unsuppressed residual signals, blocking circuit means is in the transmit channel at the output from said means for comparing and suppressing and is operable to interrupt a signal path along the transmit channel. To this end, said blocking circuit means senses the continuous suppression of the residual signal for a first period of time and thereafter interrupts the signal path to block from the transmit channel sporadically occurring unsuppressed residual signals having a duration less than a second period of time.

The invention also contemplates a method of suppressing residual echo in a telephone system having separate transmit and receive channels and wherein an echo canceller is connected with the transmit channel for subtracting or cancelling an echo estimate from a true echo in an uncancelled signal on the channel to leave a residual signal on the channel. The method comprises the steps of comparing the values of the uncancelled and of the residual signals, and suppressing the residual signal when the value of the same has a selected proportionality to the value of the uncancelled signal.

Preferably, the method of the invention also includes the steps of detecting the presence of speech signals on the transmit channel and rendering said suppressing step inoperative whenever speech is detected on the transmit channel, and of preventing the transmission of sporadically occurring unsuppressed residual signals along the channel. To accomplish the latter, further included are the steps of sensing whether the residual signal is or is not suppressed, establishing a path along the transmit channel when the residual signal is suppressed, sensing continuous suppression of the residual signal for at least a first period of time and, after the residual signal has been continuously suppressed for at least said first period of time, interrupting the path along the transmit channel whenever the residual is unsuppressed for less than a second period of time. Should the residual signal be unsuppressed for at least said second period of time, or again be suppressed prior to the end of said second period of time, the path along the transmit channel is reestablished.

The invention thus provides an improved apparatus for and method of suppressing residual echo which otherwise passes uncancelled through an echo canceller. The suppression technique is based upon a correlation of the uncancelled signal with the residual signal on an instantaneous basis and includes a hysteresis effect which detects isolated instantaneous uncorrelated cases. Whenever correlation exists or the hysteresis effect detects isolated uncorrelated cases, suppression is enacted. Thus, the technique effectively measures the cancellation process or effect on an instantaneous basis and provides a fast and precise means for controlling insertion and removal of suppression.

The foregoing and other objects, advantages and features of the invention will become apparent upon a consideration of the following detailed description when taken in conjunction with the accompanying drawings.

DETAILED DESCRIPTION

Long distance telephone systems generally comprise four-wire transmission circuits between central switching offices in different local exchange areas and two-wire circuits within each area connecting individual subscribers with the switching office, with conversion of speech energy between the two and four-wire circuits being effected by hybrid circuits. As is conventional, one pair of wires in the four-wire circuit carries signals from one subscriber to the other and the other pair carries signals from the other subscriber to the one. Ideally, the hybrid circuit port impedances perfectly match the impedances of the two-wire and the four-wire circuits, and the hybrid circuit balance network perfectly matches the impedance of the two-wire circuit, so that voice signals transmitted over one pair of wires will not be reflected or returned over the other pair to the speaker as an echo signal. However, due to impedance differences which inherently exist between different two and four-wire circuits, and since impedances must be matched at each frequency in the voice band, it is virtually impossible to provide a hybrid circuit which will perfectly match any particular transmission circuit. Echo is, therefore, inherent in long distance telephone systems and some means, such as echo cancellation, is required to reduce echo signals to a tolerable or acceptable level.

To facilitate describing long distance telephone systems, the systems are usually considered to have near and far ends, the near end merely being that end of the facility which is nearby or close and the far end being an opposite or distant end. Similarly, subscribers using such facilities are referred to as near and far end subscribers. For either subscriber the pair of wires at his end of the four-wire circuit over which he receives voice signals from the distance subscriber is considered as comprising a receive channel, and the pair of wires over which his voice signals are transmitted is called a transmit channel. Thus, a pair of wires which is a transmit channel at one end of the system defines a receive channel at the opposite end, and vice versa.

Figure 1:
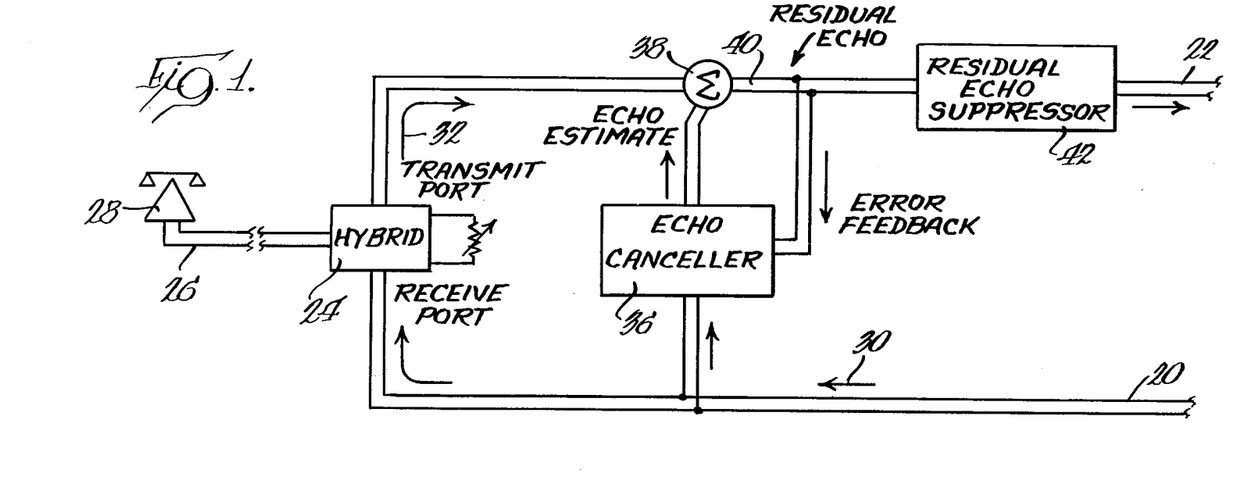
FIG. 1 is a block diagram representation of an echo canceller and a residual echo suppressor connected with one end of a four-wire to two-wire telephone transmission facility.

FIG. 1 diagrammatically illustrates a near end of a long distance telephone facility, although it could just as well be a far end. The facility includes a four-wire circuit comprising a receive channel 20 and a transmit channel 22 connected through a hybrid circuit 24 with a two-wire circuit 26 leading to a telephone set 28 of a near end subscriber. As is understood, the receive channel 20 carries a far end subscriber's voice signal, as indicated by the arrow 30, to the hybrid circuit for connection with the near end subscriber over the two-wire circuit 26. The hybrid circuit also serves to connect the near end subscriber's voice signals with the transmit channel 22, as indicated by the arrow 32, for transmission to the far end subscriber.

Where four-wire to two-wire facilities are interconnected by a hybrid circuit, echo is created when a portion of the signal on the receive channel is transferred across the hybrid to the transmit channel and returned to the far end speaker. On long delay circuits, when round trip propagation time exceeds about 40 milliseconds, the resulting echo becomes a detriment to speech.

In order to deal with system echo, echo cancellers are now being used at each end of four-wire circuits. Echo cancellation is a method of echo control wherein an echo estimate is computed and then subtracted from the return echo signal. To this end, an echo canceller 36 is connected at an input thereto with the signal on the receive channel and at an output with a summation circuit 38 in the transmit channel 22. The echo canceller samples the signal on the receive channel, and generates at its output an echo estimate which is a negative approximation of the echo expected to occur on the transmit channel in response to the sampled receive channel signal. The summation circuit then substracts the echo estimate from the actual echo by means of adding the negative echo estimate to the actual echo so that only a residual echo, which equals the difference between the actual echo and the echo estimate, appears at an output 40 from the summation circuit.

In order to enhance the accuracy of the echo estimate, thereby to make the estimate as closely identical as possible to the actual echo, the residual echo is coupled to the echo canceller as an error feedback signal and enables the echo canceller to "revise" the echo estimate in a manner which decreases the level of residual echo. Although as much as 30 dB of echo return loss enhancement or echo cancellation is possible, the resulting residual echo is still disturbing to a far end subscriber, so that additional control is required to eliminate the residual echo. Accordingly, a residual echo suppressor 42 is connected in the transmit channel at the output from the summation circuit.

PRIOR ART

Figure 2:
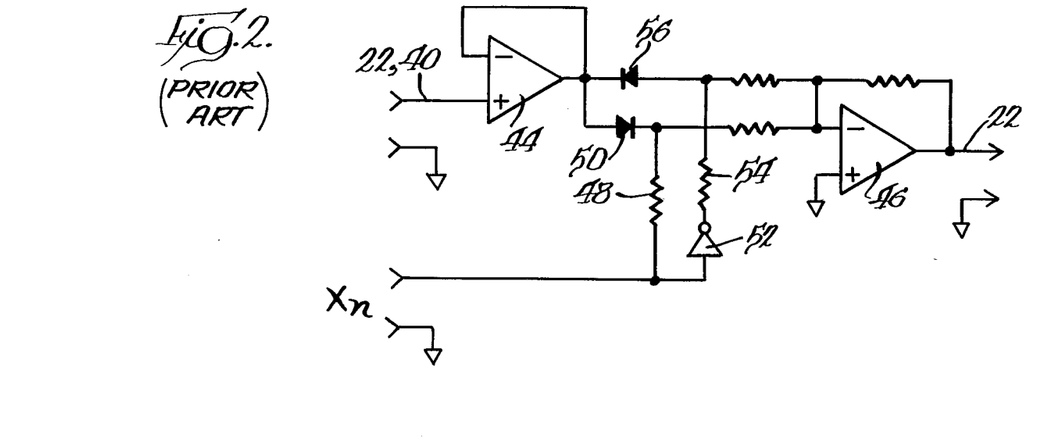
FIG. 2 is a schematic representation of a prior art analog type adaptive center clipping circuit for suppressing uncancelled residual echo on a transmit channel of a four-wire transmission circuit.
Figure 3A:
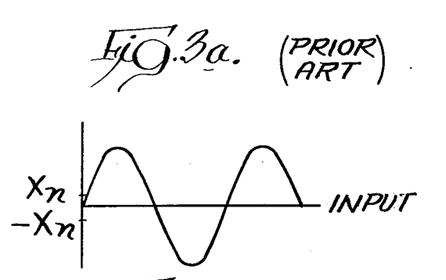
FIGS. 3a–c are graphical representations of waveforms associated with the circuit of FIG. 2.
Figure 3B:
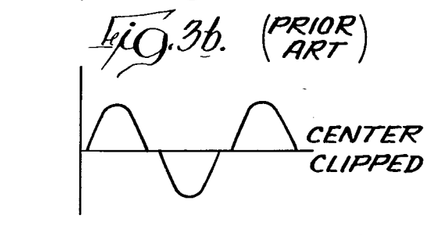

One known type of residual echo suppression is shown in FIG. 2 and comprises an analog "adaptive center clipping" circuit positioned in line with the transmit channel. Adaptive center clipping is a suppression technique based on a comparison of the time-averaged speech energy components on the transmit and receive paths, wherein suppression is enacted in the event of receive speech energy being greater than transmit speech energy. The circuit includes a variable threshold operational amplifier (op amp) 44 which connects at its input with the transmit channel at the output from the summation circuit 38, and an output op amp 46. The op amp 44 causes a squelching or clipping action on center portions of the transmit channel signal by means of application of a reverse bias voltage $x_n$ through a resistor 48 to a diode 50 and through an inverting amplifier 52 and a resistor 54 to a diode 56, the reverse bias voltage normally being made to vary in value as a function of the time average value of speech energy on the receive channel. The result is that the signal from the summation circuit, as shown in FIG. 3a and applied to the input to the op amp 44, is center clipped or squelched so that only those portions of the signal which have an absolute level greater than the level of the reverse bias voltage, as shown in FIG. 3b, are coupled through the center clipping circuit for transmission to the far end subscriber. Thus, as long as residual echo has a level less than that of the reverse bias voltage, it is completely blocked from being returned to the far end subscriber.

Figure 3C:
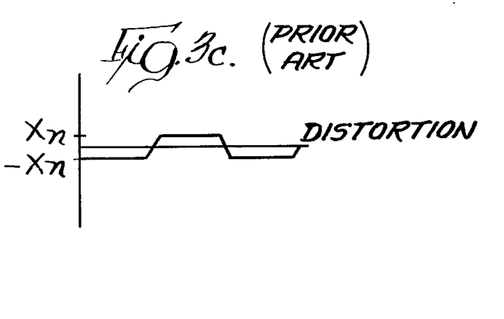

Although the analog type of adaptive center clipping circuit is relatively effective in controlling residual echo, it has certain disadvantages. In particular, because of its manner of operation a cross-over distortion effect, as shown in FIG. 3c, results from the removal of the center portions of those signals on the transmit channel which are greater than the reverse bias voltage $x_n$, for example near end speech signals, which reduces the fidelity of the signals transmitted to the far end subscriber. Although the magnitude of distortion may be decreased through preemphasis and deemphasis filtering and by removing the adaptive center clipping circuit from operation when near end speech is detected, such requires "break-in" (50–150 milliseconds) and "hang-over" (100–240 milliseconds) times which delay insertional and removal of the residual echo suppressor, and therefore corresponding periods in which voice signals are not and residual echo is transmitted to the far end subscriber.

Figure 4:
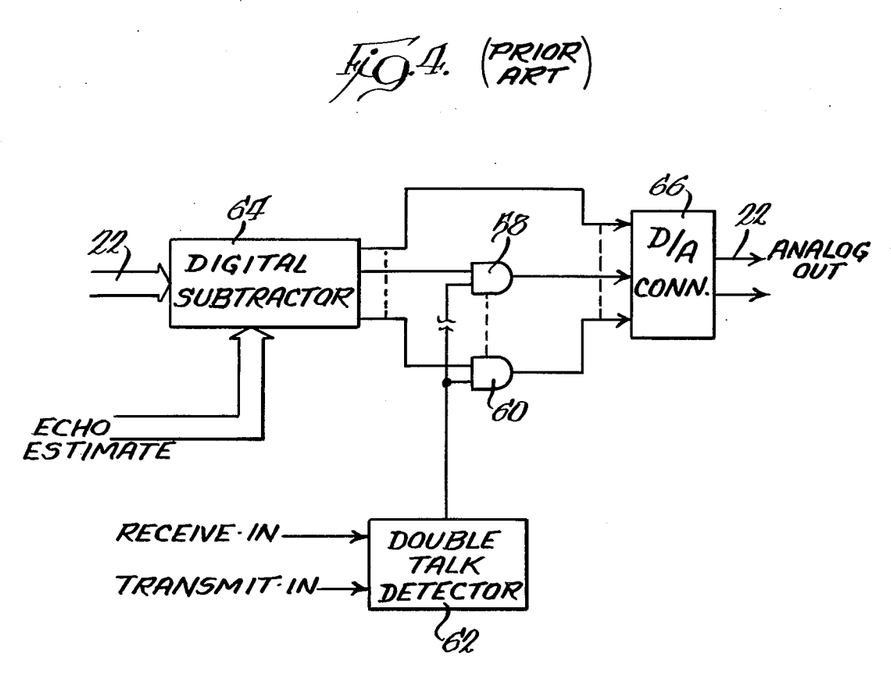
FIG. 4 is a diagrammatic representation of a prior art digitally implemented center clipping circuit for reducing residual echo.

Another type of prior art residual echo suppressor is shown in FIG. 4 and comprises a digitally implemented center clipper circuit. The circuit includes, generally, a group of AND gates, with only a pair of the AND gates 58 and 60 being shown, each for receiving at one input a signal from a double talk detector 62 which compares the signal levels on the receive and transmit channels and generates an output upon the comparison indicating the presence of speech on the transmit channel. The residual echo suppressor is for use with a digital echo canceller, wherein near end analog transmit channel signals are digitally encoded for processing, and are then reconverted to an analog format for transmission to a far end subscriber. To that end, each AND gate is connected at another input thereto with a digital subtractor 64 which corresponds to the summation circuit 38 in FIG. 1. One input to the digital subtractor is connected with the transmit channel 22 toward the near end subscriber for receiving digitally encoded signals, and another input is connected with the echo canceller for receiving a digitally encoded echo estimate for subtraction from the signal on the transmit channel. Thus, the output from the digital subtractor comprises any speech signals on the transmit channel plus residual echo signals, with the most significant bits of the signals being applied directly to, and with the lesser significant bits being connected through the AND gates 58 and 60 to, a digital to analog converter 66. The digital to analog converter then converts the digital signal at its input to an analog signal at its output for transmission to a far end subscriber.

In operation, the AND gates 58 and 60 are controlled by the double talk detector 62 to either pass or block the lesser significant bits of the signal from the digital subtractor 64. The arrangement is such that when speech energy is present on the transmit channel the AND gates are enabled to pass the lesser significant bits to the digital to analog converter, so that all of the bits are available for conversion to an analog signal. However, in the absence of near end speech the double talk detector disables the AND gates so that the lesser significant bits of the signal are blocked, whereby any residual echo having a value less than that which may be represented by the lesser significant bits is not transmitted to the far end subscriber.

Although the echo suppressor in FIG. 4 is relatively effective in reducing the level of residual echo, if double talk is detected on an instantaneous speech sample basis, false detection of double talk is encountered when a zero cross-over value on the receive channel signal is compared in magnitude to a nonzero transmit channel residual echo signal. False detection enables the AND gates 58 and 60 and induces "choppiness" in the residual echo signal, allowing some of it to sporadically be transmitted. If choppiness is eliminated by detecting double talk on a time average basis, then "break-in" and "hang-over" times are introduced into the suppression process. Also, signals having a value greater than that represented by the lesser significant bits are subject to a center clipped distortion effect. Consequently, The conventional digital residual echo suppressor has the same characteristics and associated disadvantages as the conventional analog residual echo suppressor.

THE INVENTION

The invention improves upon the prior art by providing a novel residual echo suppressor which effectively suppresses residual echo on a transmit channel without introducing center clipping or distortion into signals transmitted along the channel. The residual echo suppressor is particularly adapted for use with a digital echo canceller, and examines the result of the echo cancellation process prior to transmitting it along the transmit channel. If, in the absence of near end speech as determined on an instantaneous comparison basis, the residual signal is found to be proportional to the instantaneous uncancelled signal within a specified tolerance, or has no more than a selected minimum proportionality with respect to the instantaneous uncancelled signal, it is assumed that it contains only residual echo and that the echo estimate, while not perfect, was still a reasonably good approximation. Under this circumstance, the residual echo is suppressed to zero. Should the residual signal fail the proportionality/tolerance test, which indicates that it may contain near end speech despite a failure to detect double talk, it is transmitted in its entirety along the transmit channel. This is in contrast to transmitting only those portions of the residual signal having a level in excess of a threshold level, as in center clipping. Consequently, with the residual echo suppressor of the invention signal distortion does not occur.

The suppression process thus far described tends to remove the intelligibility from residual echo signals, with the remainder of the signals consisting of sporadic samples of nonzero residual echo caused by either a false detection of double talk or by occasional bad echo estimates. In accordance with another feature of the invention, these samples are effectively filtered out through a hysteresis process which, after sensing a selected number of consecutive good echo estimates, i.e., residual echoes which have been suppressed to zero, blocks sporadic nonzero residual signals from transmission until the same number of consecutive nonzero residual signal events are sensed, whereafter transmission of the residual signal is resumed.

Collectively, the proportional comparison process provides an instantaneous indication of good echo estimates to the hysteresis process, which in turn detects the relative frequency of the good estimates and filters out the bad estimates and false double talk events which result from instantaneous double talk detection. The combination of proportional comparison, instantaneous double talk detection and hysteresis result in an operation of the echo suppressor which is very effective in eliminating residual echo, while at the same time requiring residual echo suppression insertion and removal times of only about one millisecond.

Thus, the suppression technique of the invention is based upon a correlation of the uncancelled signal with the residual signal on an instantaneous basis, and includes a hysteresis effect which detects isolated instantaneous uncorrelated cases. Whenever correlation exists or the hysteresis effect detects isolated uncorrelated cases, suppression is enacted. This technique effectively measures the cancellation process or effect on an instantaneous basis, and provides a fast and precise means for controlling insertion and removal of suppression.

Figures 5, 6:
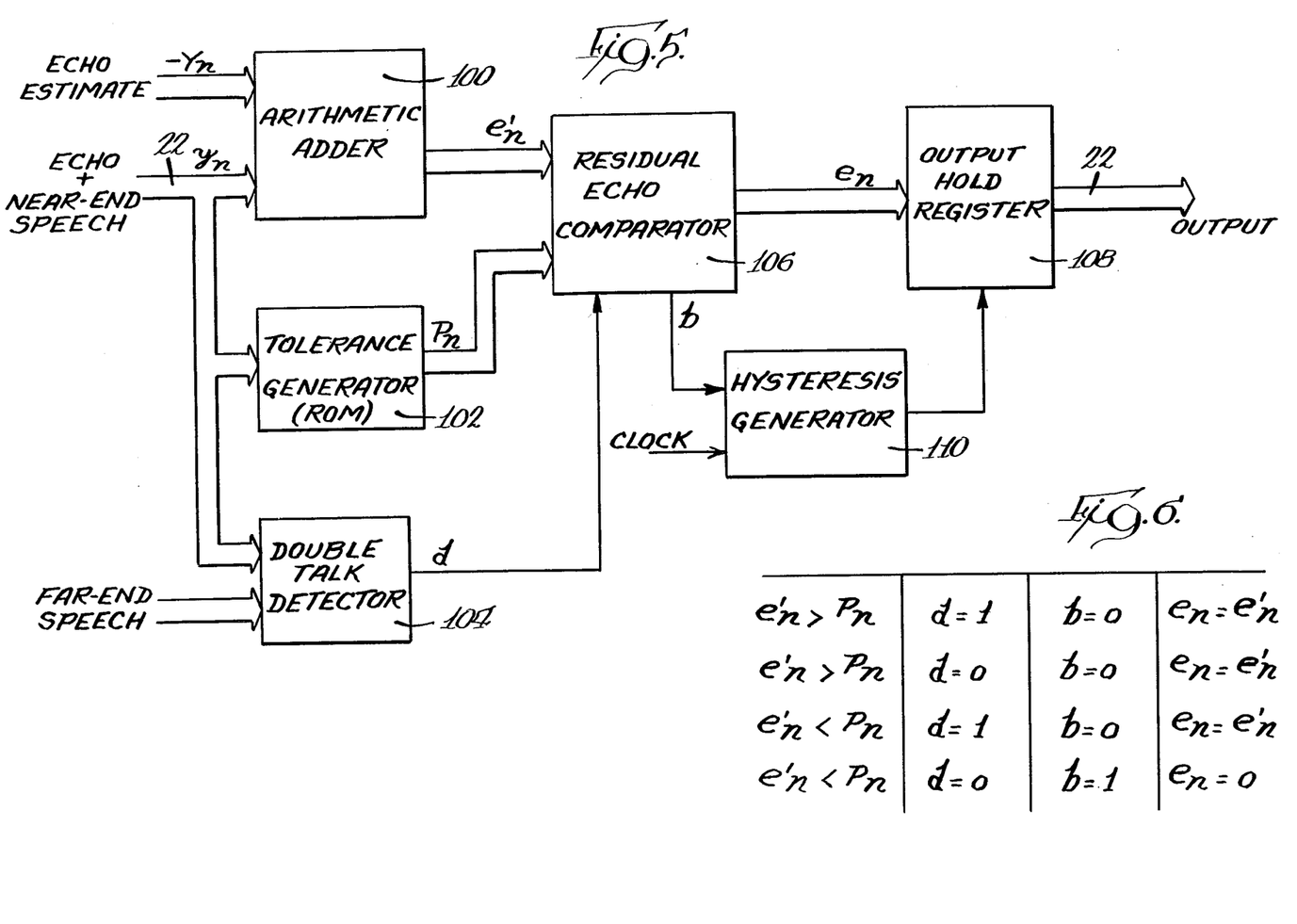
FIG. 5 illustrates in block diagram form a residual echo suppressor which embodies the teachings of the present invention.
FIG. 6 is a truth table for the residual echo suppressor shown in FIG. 5.

FIG. 5 illustrates a digital residual echo suppressor structured in accordance with a preferred embodiment of the invention. Although not forming a specific part of the residual echo suppressor, to facilitate a description thereof there is shown an arithmetic digital adder 100, corresponding to the summation circuit 38 in FIG. 1, which receives at a first input thereto a digitally encoded representation of echo plus near end speech signals $y_n$ on the transmit channel and at a second input a digitally encoded negative echo estimate signal $-r_n$ from an echo canceller, for example an echo canceller 36 as shown in FIG. 1. The arithmetic adder subtracts the echo estimate from the signal $y_n$ on the transmit channel by means of algebraically summing the signals $y_n$ and $-r_n$, and generates at its output a residual signal $e'_n$ which comprises the signal $y_n$ less the echo estimate signal $-r_n$. In the absence of any near end speech, the signal $e'_n$ consists of residual echo.

Considering now the residual echo suppressor itself, a tolerance generator 102 and a double talk detector 104 each receive at an input thereto the signal $y_n$ on the transmit channel 22. The tolerance generator is a preprogrammed read only memory (ROM) which generates at its output a digitally encoded signal $p_n$ having a value in accordance with the proportional to the value of the signal $y_n$. As will become apparent, the particular proportionality of the tolerance signal $p_n$ to the residual signal $y_n$ is a measure of the level at which it is desired to treat the residual signal as consisting solely of residual echo, and is therefore a matter of choice. The double talk detector is a comparator for determining on a substantially instantaneous basis the presence of speech on the transmit channel, and to that end has a second input to which is applied a digitally encoded representation of the level of far end speech on the receive channel. In operation, the double talk detector compares the signal levels on the transmit and receive channels and generates an output signal d having an active logic level 1 when the transmit channel signal level is greater than one half the maximum level of recently obtained receive channel signal samples, and having an inactive logic level 0 otherwise.

The output signals from the arithmetic adder 100, the tolerance generator 102 and the double talk detector 104 are applied to a residual echo comparator 106 which performs a residual echo suppressing function. In particular, the residual echo comparator compares the values of the residual signal $e'_n$ and the tolerance generator signal $p_n$, or compares the proportionality of the signal $e'_n$ to the signal $y_n$ since the signal $p_n$ is a function of the signal $y_n$, for example the signal $p_n$ may be equal to 20% of the value of the signal $y_n$, and if the signals have a predetermined relationship, and near end speech is absent as indicated by the logic level of the signal d, it is assumed that there is only residual echo, and no speech, in the residual signal. Under this circumstance the residual echo comparator then suppresses to zero the residual signal $e'_n$, so that a signal $e_n$ at a first output from the comparator is zero. Simultaneously, the comparator generates at a second output therefrom a signal b having an active logic level 1. For comparisons of the signals $e'_n$ and $p_n$ which fail the proportionality test, or whenever near end speech is present as indicated by the signal d, the residual echo comparator is rendered inactive so that the residual signal $e'_n$ is passed therethrough as the signal $e_n$, and the signal b has an inactive logic level 0.

If the output signal $e_n$ from the residual echo comparator 106 were connected with the transmit channel 22 leading to the far end subscriber, the residual echo suppressor as thus far described would remove the intelligibility from any echo in the signal. However, the signal $e_n$ would contain sporadic samples of nonzero residual echo caused by either false detection of double talk or by occasional bad echo estimates, with the result that the signal received by the far end subscriber, although improved, would still contain sporadic disturbances. In order to eliminate such disturbances, in accordance with another feature of the invention the residual echo suppressor also includes an output hold register or gate means 108 and a hysteresis generator 110 which effectively filter out sporadic echo signals from the signal transmitted to the far end subscriber. This is accomplished by sensing the occurrence of a predetermined number of consecutive good echo estimates in the absence of near end speech, i.e., residual echoes which have been suppressed to zero, and by then blocking from transmission sporadically occurring nonzero residual echo signals. Thereafter, and in order to accommodate break-in and permit the transmission of near end speech without substantial delay, should the same predetermined number of consecutive nonzero residual signal events be sensed, transmission of the residual signal is resumed.

To accomplish the hysteresis process, the hysteresis generator 110 receives clock pulses at a first input thereto and the signal b from the residual echo comparator 106 at a second input thereto, and is under control of the logic state and the duration of the logic state of the signal b to provide the clock pulses at its output and to the output hold register 108. The arrangement is such that upon the occurrence of an active logic level 1 of the signal b, clock pulses are allowed to pass through the hysteresis generator and to the output hold register. Then, and after the signal b has been active for at least j consecutive clock pulses, or for at least a predetermined time, e.g., the time required for at least j clock pulses to occur, the clock pulses are prevented from passing through the hysteresis generator unless the signal b remains active. Should the signal b become an inactive logic 0, clock pulses are blocked from passage through the hysteresis generator until the signal b is inactive for at least j consecutive clock pulses, or for at least the predetermined time, whereupon clock pulses again pass through the hysteresis generator. The output hold register 108 receives the signal $e_n$ from the residual echo comparator at an input thereto, is connected at an output therefrom with the transmit channel 22 to the far end subscriber, and operates as a latch or gate for transferring the signal $e_n$ at its input to its output upon each occurrence of a clock input. A truth table for the residual echo suppressor is shown in FIG. 6.

Considering now the overall operation of the residual echo suppressor, the signal $y_n$ on the transmit channel 22, which may comprise echo and/or near end speech, along with the negative echo estimate signal $-r_n$, are summed in the arithmetic adder 100 to produce the residual signal $e'_n$. When there is no near end speech the signal $y_n$ consists entirely of echo, and therefore the signal $e'_n$ consists entirely of residual echo.

The transmit channel signal $y_n$ is also applied to the tolerance generator or ROM 102, and addresses a particular memory location therein in accordance with its value or level. The ROM then produces the tolerance signal $p_n$ which has a value in accordance with the particular memory addressed and which is proportional to and representative of the value of the signal $y_n$.

To detect the occurrence of speech on the transmit channel, the signal $y_n$ is also applied to the double talk detector 104 where it is compared in level to one half the level of the largest sample of a recent group of samples or receive channel signal level. Based upon the comparison, the output signal d from the double talk detector becomes an active logic level 1 when near end speech occurs, i.e., when the level of the transmit channel signal $y_n$ is greater than one half the level of the largest receive channel sample, and is an inactive logic level 0 otherwise. The comparison made by the double talk detector is based on an expected minimum loss of 6 dB across the hybrid circuit, which means that any echo signal on the transmit channel will always have a level less than one-half that of the largest sample of receive channel signal. The particular operation of the double talk detector, therefore, tends to favor detection of double talk.

The residual signal $e'_n$, which may or may not contain near end speech, along with the tolerance signal $p_n$ from the tolerance generator 102, are applied to the residual echo comparator 106 which compares the same to determine whether the echo estimate signal $-r_n$ was a reasonably close approximation of the actual echo. If the residual signal $e'_n$ is greater than or equal to zero, and also less than the tolerance signal $p_n$, and if the occurrence of near end speech is not indicated by the logic level of the signal d, the residual echo comparator suppresses the residual signal $e'_n$ to zero and outputs a value of zero for the signal $e_n$, which is then the residual suppressed echo. At the same time, and whenever the residual signal $e'_n$ is suppressed to zero, the signal b from the residual echo comparator is an active logic level 1. If desired, or if necessary for control of an associated echo canceller, a digital polarity may be associated with the residual suppressed echo signal $e_n$ which is the same as the polarity of the residual echo signal $e'_n$, so that the signal $e_n$ is either a plus or a minus zero.

In the case where the residual signal $e'_n$ is greater than the tolerance signal $p_n$, either a poor echo estimate signal $-r_n$ was generated by the echo canceller, so that the residual echo is large, or the transmit channel signal $y_n$ contains near end speech as well as echo. When this occurs, and/or upon the output signal d from the double talk detector 104 being an active logic level 1, the residual echo comparator is rendered inoperative to suppress the residual signal $e'_n$, so that the output signal $e_n$ equals the residual signal $e'_n$, and the signal b is brought to an inactive logic level 0.

In practice, it has been found that occasional bad echo estimates by the echo canceller, or false detection of double talk, will cause the residual echo signal $e'_n$ to be passed through the residual echo comparator and appear as the output signal $e_n$. Such sporadic residual echo signals $e_n$ must be blocked from transmission in order to achieve acceptable performance. To this end, the output hold register 108 and the hysteresis generator 110 provide suppression for such sporadically occurring residual echo signals.

The signal b from the residual echo comparator 106 indicates whether the output signal $e_n$ is zero or nonzero, with the signal b going to an active logic level 1 when the signal $e_n$ is zero. The signal b is applied to the hysteresis generator 110, and upon going active clock signals are allowed to pass therethrough for application to the output hold register 108. After the hysteresis circuit senses that the signal b has been active for j consecutive clock pulses, the clock pulses are then blocked from passing therethrough unless the signal b remains active, in which case the zero level of the signal $e_n$ is clocked through the output hold register. Obviously, since the value of the signal $e_n$ is zero, no echo is heard by the far end subscriber.

Should the signal $e_n$ become nonzero, which may occur in response to near end speech, a poor echo estimate and/or false detection of double talk, the signal b becomes inactive. While the signal b remains inactive, and for at least j consecutive clock pulses, clock pulses are blocked from passage through the hysteresis generator to the output hold register. Consequently, upon the sporadic occurrence of nonzero values of the signal $e_n$, the same are not clocked through the output hold register to the far end subscriber for up to j clock pulses.

After the signal b has been inactive, indicating a nonzero value of the signal $e_n$, for j consecutive clock pulses, it is assumed that speech is present on the transmit channel and the hysteresis action is reversed. Clock pulses are then passed through the hysteresis generator to the output hold register for all values of the signal $e_n$ until the signal b again goes active, in response to a zero level of the signal $e_n$, for j consecutive clock pulses, whereupon the cycle is repeated. In practice, it has been found that effective residual echo suppression results when the clock pulses have a frequency of about 8 KHz and when $j=8$. Accordingly, the break-in and hangover times of the residual echo suppressor, or the times required for the hysteresis circuit to reverse itself, are only 1 millisecond, which times are considerably shorter than those experienced with residual echo suppressors of conventional type.

The invention thus provides an improved residual echo suppressor for an echo canceller. As compared with conventional residual echo suppressors, suppression occurs in response to a comparison of the residual signal to the uncancelled signal from which it was produced, and not by any center clipping techniques which would introduce distortion into the transmitted signal. In addition, the invention provides a unique hysteresis circuit which measures the relative frequency of suppressed echo signals to unsuppressed signals, and prevents unwanted sporadic transmissions of unsuppressed signals. Also, since double talk may be detected on an instantaneous basis without causing sporadic transmissions of residual echo, long insertion and removal delays of the residual echo suppressor are not required.

While embodiments of the invention have been described in detail, it is understood that various modifications and other embodiments thereof may be devised by one skilled in the art without departing from the spirit and the scope of the invention, as defined in the appended claims.

What is claimed is:

1. A residual echo suppressor for use with an echo canceller in telephone systems having separate transmit and receive channels, wherein the echo canceller is of the type having means in the transmit channel for subtracting or cancelling an echo estimate from a true echo in an uncancelled signal on the channel to leave a residual signal on the channel, said residual echo suppressor comprising means in the transmit channel for comparing the values of the uncancelled and the residual signals and for suppressing the residual signal when the ratio of the value of the same to the value of the uncancelled signal has less than a selected value.

2. A residual echo suppressor as in claim 1, including means for detecting the presence of speech signals on the transmit channel, said detecting means being coupled with said means for comparing and suppressing for controlling the same to prevent suppression of the residual signal when speech signals are present.

3. A residual echo suppressor as in claim 1 or 2, said means for comparing and suppressing including a tolerance generator for receiving the uncancelled signal and for generating a tolerance signal having a value representative of the value of the uncancelled signal, said means for comparing and suppressing comparing the value of the residual signal to the value of said tolerance signal.

4. A residual echo suppressor as in claim 3, said tolerance generator comprising a preprogrammed read only memory having a plurality of memory locations which are selectively addressed in accordance with the value of the uncancelled signal, said tolerance signal having a value in accordance with the particular memory location addressed.

5. A residual echo suppressor as in claim 2, said means for detecting the presence of speech on the transmit channel including double talk detecting means coupled with the signal on the receive channel and the uncancelled signal on the transmit channel for comparing the values of the same and for generating an output upon the uncancelled signal value comprising at least a selected proportion of the value of the receive channel signal.

6. A residual echo suppressor as in claim 2, said means for comparing and suppressing including a tolerance generator for receiving the uncancelled signal and for generating a tolerance signal having a value representative of the value of the uncancelled signal, said means for comparing and suppressing comparing the values of the residual and said tolerance signals and: (a) upon the value of the residual signal being greater than the value of said tolerance signal, and irrespective of the presence or absence of speech on the transmit channel, not suppressing the residual signal; (b) upon the value of the residual signal being less than the value of said tolerance signal, and when speech is present on the transmit channel, not suppressing the residual signal, and (c) upon the value of the residual signal being less than the value of said tolerance signal, and when speech is absent from the transmit channel, suppressing the residual signal.

7. A residual echo suppressor as in claim 1 or 2, including blocking circuit means in the transmit channel for establishing and interrupting a signal path along the transmit channel from said means for comparing and suppressing in accordance with the residual signal being suppressed or unsuppressed to prevent sporadic transmission of unsuppressed residual signal, said blocking circuit means establishing the signal path along the transmit channel upon the residual signal being suppressed and for as long as the residual signal remains suppressed and thereafter, after the residual signal is continuously suppressed for at least a first period of time, interrupting the path whenever and while the residual signal is unsuppressed for less than a second period of time and then reestablishing the path either upon the residual signal again being suppressed before the end of said second period of time or upon the residual signal continuously remaining unsuppressed for at least said second period of time, said blocking circuit means cycle of operation repeating itself upon the path being reestablished in response to the residual signal continuously remaining unsuppressed for at least said second period of time.

8. A residual echo suppressor as in claim 7, wherein said first and second periods of time are equal.

9. A residual echo suppressor as in claim 1 or 2, including blocking circuit means in the transmit channel for establishing and interrupting a signal path along the transmit channel from said means for comparing and suppressing in accordance with the residual signal being suppressed or unsuppressed to prevent sporadic transmission of unsuppressed residual signal, said means for comparing and suppressing also generating and applying to said blocking circuit means a control signal whenever the residual signal is suppressed, said blocking circuit means having an input for receiving clock pulses and establishing the signal path along the transmit channel upon occurrence of said control signal and for as long as said control signal is continuously present and thereafter, after the continuous presence of said control signal for a first number of clock pulses, interrupting the path whenever and while said control signal is absent for less than the occurrence of a second number of clock pulses and then reestablishing the path either upon said control signal again being present prior to occurrence of said second number of clock pulses or upon said control signal continuously being absent for at least said second number of clock pulses, said blocking circuit means cycle of operation repeating itself upon the path being reestablished in response to the absence of said control signal for at least said second number of clock pulses, whereby said residual echo suppressor presents the sporadic transmission of unsuppressed residual signal along the transmit channel.

10. A residual echo suppressor as in claim 9, wherein said first and second numbers of clock pulses are equal.

11. A residual echo suppressor as in claim 9, said blocking circuit means including a hysteresis generator circuit and an output hold register circuit in the transmit channel for coupling along the transmit channel the output from said means for comparing and suppressing, said output hold register having an enable input thereto and coupling the output from said means for comparing and suppressing along the transmit channel upon each occurrence of a clock pulse at said enable input, said hysteresis generator circuit having a first input for receiving said control signal, a second input for receiving clock pulses, and an output connected with said enable input to said output hold register circuit for connecting clock pulses from said second input to said enable input under control of said control signal, said hysteresis generator circuit connecting clock pulses to said enable input upon occurrence of said control signal and for as long as said control signal is continuously present and thereafter, after the continuous presence of said control signal for at least said first number of clock pulses, interrupting connection of clock pulses to said enable input whenever and while said control signal is absent for less than the occurrence of said second number of clock pulses and then reestablishing connection of clock pulses to said enable input either upon said control signal again being present prior to occurrence of said second number of clock pulses or upon said control signal continuously being absent for at least said second number of clock pulses, said hysteresis generator circuit cycle of operation repeating itself upon clock pulses again being connected to said enable input in response to the absence of said control signal for at least said second number of clock pulses.

12. A residual echo suppressor as in claim 1 or 2, including blocking circuit means in the transmit channel at the output from said means for comparing and suppressing and operable to interrupt a signal path along the transmit channel, said blocking circuit means sensing the continuous suppression of the residual signal for a first period of time and thereafter interrupting the signal path to block from the transmit channel sporadically occurring unsuppressed residual signals having a duration less than a second period of time.

13. A residual echo suppressor for use with an echo canceller in telephone systems having separate transmit and receive channels, wherein the echo canceller is of the type having means in the transmit channel for subtracting or cancelling an echo estimate from a true echo on the channel to leave a residual echo on the channel, said residual echo suppressor comprising means in the transmit channel for comparing the value of the residual echo to the value of the true echo when other signals are absent on said transmit channel and for suppressing the residual echo when the ratio of the value of the same to the value of the true echo has less than a selected valve.

14. A residual echo suppressor as in claim 13, including gate means in the transmit channel for establishing and interrupting a path along the channel from said means for comparing and suppressing, and monitoring means coupled with said gate means and with said means for comparing and suppressing for detecting whether the residual signal is or is not being suppressed, for monitoring the durations of suppression and unsuppression of the residual signal and for controlling said gate means to establish a path along the transmit channel when the residual signal is suppressed and to interrupt the path along the channel whenever the residual signal is not suppressed for less than a first period of time after initially being continuously suppressed for at least a second period of time.

15. A residual echo suppressor as in claim 14, said monitoring means controlling said gate means to establish the path along the transmit channel upon the residual signal being unsuppressed for at least said first period of time after initially being suppressed for at least said second period of time.

16. A residual echo suppressor as in claim 13 or 14, including means for detecting the occurrence of speech energy on the transmit channel and for controlling operation of said means for comparing and suppressing to render the same inoperative to suppress residual echo in response to speech energy being detected.

17. A residual echo suppressor as in claim 16, said means for detecting being coupled with the transmit and receive channels for comparing the values of signals thereon and for rendering said means for comparing and suppressing inoperative to suppress residual echo whenever the signal values have a selected relationship.

18. A residual echo suppressor as in claim 17, said means for detecting rendering said means for comparing and suppressing inoperative to suppress residual echo whenever the instantaneous value of the signal on the transmit channel is greater than one half the value of the largest value sample in a group of recently obtained receive channel signal samples.

19. A residual echo suppressor for use with an echo canceller in telephone systems having separate transmit and receive channels, wherein the echo canceller is of the type having means in the transmit channel for subtracting or cancelling an echo estimate from a true echo in an uncancelled signal on the channel to leave a residual signal on the channel, said residual echo suppressor comprising suppressor means in the transmit channel controllable to suppress the residual signal on the channel when the ratio of the value of the residual signal to the value of the uncancelled signal has less than a selected value, and blocking means in the transmit channel for establishing or interrupting a path for the residual signal along the channel, said blocking means establishing a path when the residual signal is suppressed and interrupting the path whenever the residual signal is not suppressed for less than a first period of time after initially being continuously suppressed for at least a second period of time.

20. A residual echo suppressor as in claim 19, said blocking means establishing the path along the transmit channel upon the residual signal not being suppressed for at least said first period of time after initially being suppressed for at least said second period of time.

21. A method of suppressing residual echo in a telephone system having separate transmit and receive channels, wherein an echo canceller is connected with the transmit channel for subtracting or cancelling an echo estimate from a true echo in an uncancelled signal on the channel to leave a residual on the channel, comprising the steps of comparing the values of the uncancelled and of the residual signals, and suppressing the residual signal when the ratio of the value of the same to the value of the uncancelled signal has less than a selected value.

22. A method of suppressing residual echo as in claim 21, wherein said comparing step comprises generating a tolerance signal having a value in accordance with the value of the uncancelled signal, and monitoring the values of the residual signal and said tolerance signal, said suppressing step being rendered operative whenever the monitored signal values have a selected relationship.

23. A method of suppressing residual echo as in claim 22, including the steps of detecting the presence of speech signals on the transmit channel, and rendering said suppressing step inoperative in response to speech being detected on the transmit channel.

24. A method of suppressing residual echo as in claim 23, wherein said suppressing step is rendered operative when the value of the residual signal is less than the value of said tolerance signal and when speech signals are absent from the transmit channel.

25. A method of suppressing residual echo as in claim 21, including the steps of sensing whether the residual signal is or is not being suppressed, establishing a signal path along the transmit channel from the point of suppression when the residual signal is being suppressed, sensing continuous suppression of the residual signal for at least a first period of time and, after the residual signal has been continuously suppressed for at least said first period of time, interrupting the path along the transmit channel whenever the residual signal is unsuppressed for less than a second period of time.

26. A method of suppressing residual echo as in claim 25, including the step, after said interrupting step, of reestablishing the path along the transmit channel after the residual signal is continuously unsuppressed for at least said second period of time.

27. A method of suppressing residual echo in a telephone system having separate transmit and receive channels, wherein an echo canceller is connected with the transmit channel for subtracting or cancelling an echo estimate from a true echo in an uncancelled signal on the channel to leave a residual signal on the channel and a suppressor is connected with the channel for controllably suppressing the residual signal, comprising the steps of sensing whether the residual signal is or is not suppressed, establishing a path along the transmit channel from the point of suppression when the residual signal is suppressed, sensing a continuous suppression of the residual signal for at least a first period of time and, thereafter, interrupting the path along the transmit channel whenever the residual signal is not suppressed for less than a second period of time.

28. A method of suppressing residual echo as in claim 27, including the step, after said interrupting step, of reestablishing the path along the transmit channel after the residual signal is unsuppressed for at least said second period of time.

29. In an apparatus for suppressing residual echo in a telephone system having separate transmit and receive channels, wherein an echo canceller is connected with the transmit channel for subtracting or cancelling an echo estimate from a true echo in an uncancelled signal on the channel to leave a residual signal on the channel, and a residual signal suppressor is connected with the transmit channel for controllably suppressing the residual signal, gate means in the transmit channel for establishing and interrupting a path along the channel from the residual signal suppressor, and monitoring means coupled with said gate means for detecting whether the residual signal is or is not being suppressed, for monitoring the durations of suppression and unsuppression of the residual signal and for controlling said gate means to establish a path along the transmit channel when the residual signal is suppressed and to interrupt the path along the channel whenever the residual signal is not suppressed for less than a first period of time after initially being continuously suppressed for at least a second period of time.

30. In an apparatus as in claim 29, said monitoring means controlling said gate means to establish the path along the transmit channel upon the residual signal being unsuppressed for at least said first period of time after initially being suppressed for at least said second period of time.

31. A residual echo suppressor for use with an echo canceller in telephone systems having separate transmit and receive channels, wherein the echo canceller is of the type having means in the transmit channel for subtracting or cancelling an echo estimate from a true echo in an uncancelled signal on the channel to leave a residual signal on the channel, said residual echo suppressor comprising means in the transmit channel for comparing the values of the uncancelled and the residual signals on an instantaneous basis and for suppressing the residual signal when the ratio of the value of the residual signal to the value of the uncancelled signal has less than a selected value, and hysteresis circuit means in the transmit channel for detecting isolated absences of suppression of the residual signal and for interrupting a signal path for the residual signal along the transmit path in response thereto.

32. A residual echo suppressor as in claim 31, said hysteresis circuit means detecting a continuous occurrence of suppression for at least a first period of time, and thereafter interrupting the signal path along the transmit channel in response to an absence of suppression for less than a second period of time.

33. A residual echo suppressor as set forth in claim 32, wherein said hysteresis circuit reestablishes the path along the transmit channel in response to the absence of suppression for at least said second period of time after first detecting a continuous occurrence of suppression for at least said first period of time.

* * * * *